Aug. 19, 1930.    H. G. WETHALL    1,773,561
ARTIFICIAL BAIT
Filed Sept. 7, 1928
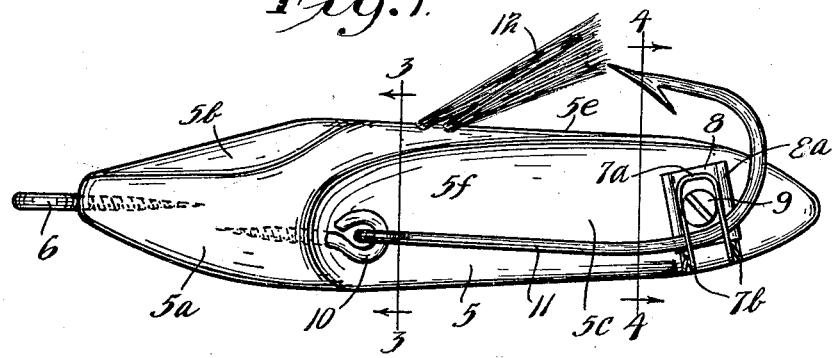
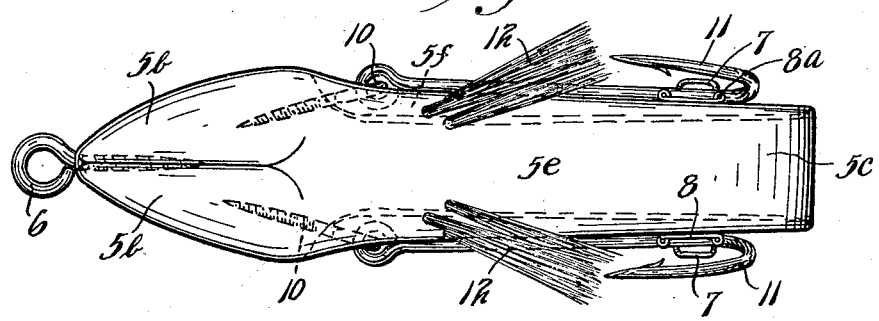
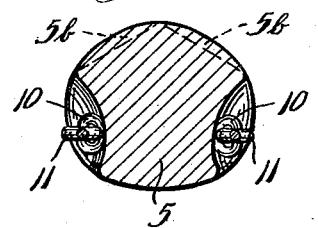
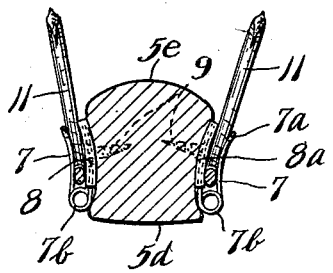
Inventor
Hans G. Wethall
By his Attorneys Patented Aug. 19, 1930

1,773,561

UNITED STATES PATENT OFFICE

HANS G. WETHALL, OF MINNEAPOLIS, MINNESOTA

ARTIFICIAL BAIT

Application filed September 7, 1928. Serial No. 304,428.

This invention relates to an artificial fish bait. One common type of artificial fish bait now used, of which there are a great many forms, is that called a plug. These plugs usually consist of a body, which bodies are variously shaped and to which are attached a plurality of hooks. These plugs are now widely used and form a very successful artificial bait. The objection to such plugs, however, is that they cannot be used in water where there are weeds or grass, as the hooks catch on the weeds and grass and collect thereon and the use of the plug is thus interfered with. The weeds and grass dragging along with the plug render it of no use as a bait.

It is an object of this invention to provide an artificial bait comprising a plug having a plurality of hooks attached thereto constructed and arranged so that the plug can be used in water having grass and weeds therein, as well as in other water.

It is another object of the invention to provide an artificial bait comprising a plug having hooks pivoted thereto at a plurality of points, resilient clips being attached to the plug receiving the shank portions of the hooks so that the points thereof project beyond the surface of the plug, means for deflecting weeds away from the points of the hooks being also provided.

It is more specifically an object of the invention to provide an artificial bait comprising a plug having a tapered front end with means for attaching a line or leader thereto, said plug having a rearwardly extending portion of general rectangular shape in cross section with slightly recessed sides a hook being pivoted at the forward portion of each of said sides and held in a clip secured to the rear portion of said sides, the points of the hooks projecting above the top surface of the plug, said plug having tufts of stiff resilient bristles secured to its top surface and extending outwardly and rearwardly to a point adjacent the points of the hooks forming weed guards therefor.

These and other objects and advantages of the invention will be fully set forth in the following description made in connection with the accompanying drawings, in which like reference characters refer to similar parts throughout the several views and in which:—

Fig. 1 is a view in side elevation of the plug;

Fig. 2 is a plan view thereof;

Fig. 3 is a vertical section on line 3—3 of Fig. 1, as indicated by the arrows; and Fig. 4 is a vertical section on line 4—4 of Fig. 1, as indicated by the arrows.

Referring to the drawings, an artificial bait is shown comprising a plug having a body portion 5. While this body portion might be variously shaped, in the embodiment of the invention illustrated, it is shown as having a tapered front end portion $5^a$ terminating substantially in a point. A screw eye 6 extends substantially axially to the front end forming means for the attachment of a line or leader. The top surface of the portion $5^a$ is formed of two downwardly diverging flat surfaces $5^b$, while the under surface and side surfaces of the portion $5^a$ are rounded on a continuous curve. The plug has a rearwardly extending portion $5^c$ and while this portion might be variously formed, in the embodiment of the invention illustrated, it is shown as of general rectangular shape having a rather flat bottom surface $5^d$ and a more curved convex top surface $5^e$. The top and bottom surfaces $5^e$ and $5^d$ converge at the rear of portion $5^c$ substantially in a line, the rear terminal portion of the plug being slightly rounded. The portion $5^c$ is provided at each side with slight recesses $5^f$ and resilient clips or hook holding means are provided at the rear portion of these recesses. While these means might take various forms, in the embodiment of the invention illustrated, the same are shown as resilient clips 7 formed of small wire, the same comprising a U-shaped portion $7^a$ and coils $7^b$ in each of the arms of the U-shaped portion $7^a$. The ends of the clips are received in folds $8^a$ of a small plate 8 secured to the plug by a screw 9. Screw eyes 10 are secured in the plug at the forward ends of recesses $5^f$ inclining outwardly and hooks 11 are respectively pivoted to the eyes of the screws 10. The hooks 11 are thus in position so that their outer portions substantially at the juncture of the shank and bend thereof is received in the clip 7, as shown, and resiliently held therein. Tufts 12 of stiff resilient bristles are secured in the top surface 5e of the plug at each side thereof and extend outwardly and rearwardly to a point adjacent the points of the hooks 11.

In operation, the plug will be attached to the fish line either directly, or by a leader as is the common practice, and the same will then be drawn through the water either in casting or trolling. The same can be drawn through grass and weeds and the weeds will be deflected away from the points of the hooks 11 by the bristles 12, so that these bristles constitute weed guards and prevent any weeds or grass catching on the hooks. The plug is widest at the rear portion of the part 5a so that as it is drawn through the water weeds and grass are also deflected outwardly so that there is no chance of the same catching on the eyelets of the hooks 11 or eyelets of the screws 10. The plug can thus be safely drawn through the water without any danger of becoming entangled in grass, weeds or other obstructions. When a fish strikes the bait it will become hooked on one of the hooks 11 and when this occurs the hook will be moved out of engagement with the clip 7 so that it will swing freely on the screw 10 while the fish is being played. The swinging hook is desirable and almost necessary in order that the fish may be played and landed without becoming unhooked. After the fish is landed the hooks can be reengaged in the clips 7 and the plug used as described.

From the foregoing description it is seen that applicant has provided a simple and efficient bait comprising a plug and one which is weedless and so constructed and arranged that it can be cast or trolled through water having weeds and grass therein. The hooks are pivoted or swingable as a fish is hooked and thus operate just as effectively as in the plugs which are not weedless. The tufts of bristles 12 somewhat simulate the fins of a minnow and thus assist in luring and catching the fish. The bait has been amply demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:

1. An artificial bait comprising a plug having means at its front end for the attachment of a line or leader, a plurality of hooks pivoted at the sides thereof, disengageable means for holding these hooks in a definite position with their points directed outwardly until a fish is engaged, and weed guards on said plug extending rearwardly to a point adjacent the points of said hooks.

2. An artificial bait comprising a plug having a tapered front end, means at said end for the attachment of a line or leader, and a rearwardly extending portion with recessed sides, resilient hook holding means at the rear ends of said sides, rearwardly extending hooks pivotally connected to said plug engaged in said resilient means so that their points project beyond the surface of said plug and stiff resilient means secured to said plug and extending rearwardly to a point adjacent the points of said hooks forming weed guards therefor.

3. An artificial bait comprising a plug having a tapered front end and a rearwardly extending portion of general rectangular shape in cross section, the top and bottom surface of which converge at the rear end of said plug, said rearwardly extending portion having recesses at its sides, resilient clips at the rear portions of said recesses, hooks pivoted at the front portions of said recesses and being received in said clips and held with their points projecting beyond the surface of said plug and comparatively stiff resilient means secured to said plug and extending rearwardly to a point adjacent the points of said hooks forming weed guards therefor.

4. An artificial bait comprising a plug having a tapered front portion terminating substantially in a point, means at said point for the attachment of a line or leader, said tapered portion being rounded except at its top which comprises outwardly converging flat surfaces, said plug having a rearwardly extending portion with recesses formed in the sides thereof, a resilient clip at the rear end of each of said recesses, a hook pivotally secured to the plug at the forward end of each of said recesses and held in said clip so that the points of said hooks project beyond the top surface of said plug, and tufts of stiff resilient bristles secured in said plug and extending rearwardly adjacent said points forming weed guards therefor.

5. An artificial bait comprising a plug having a tapered front portion, and a rear portion of general rectangular shape in cross section, the top and bottom surfaces of which converge at the rear end of said plug, said plug being widest at the rear end of said front portion, hooks pivoted at the sides of said rear portion, and means for holding said hooks stationary until a fish is hooked.

6. An artificial bait comprising a plug having a tapered front portion, means secured to said portion for the attachment of a line or leader, said plug having a rearwardly extending portion of less transverse dimension than the rear part of said front portion, hooks pivoted to the sides of said rearwardly extending portion and means for holding said hooks in a definite position until a fish is hooked.

7. An artificial bait comprising a plug having a substantially conical front end, means for the attachment of a line or leader at said end, said plug having substantially flat sides at its rear portion, hooks pivoted at their forward ends to the sides of said plug respectively, small resilient means at said sides detachably engaging and holding said hooks in position along side of said plug and in planes substantially parallel to said sides and weed guards secured in said plug and extending rearwardly and terminating respectively adjacent the points of said hooks whereby a weedless plug is provided.

In testimony whereof I affix my signature.

HANS G. WETHALL.